US007900663B2

(12) United States Patent
Huang

(10) Patent No.: US 7,900,663 B2
(45) Date of Patent: Mar. 8, 2011

(54) METHOD FOR GRADING A WOOD SAMPLE BASED ON PITH DIRECTION AND/OR PITH LOCATION

(75) Inventor: Chih-Lin Huang, Bellevue, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 597 days.

(21) Appl. No.: 11/692,628

(22) Filed: Mar. 28, 2007

(65) Prior Publication Data

US 2008/0237096 A1 Oct. 2, 2008

(51) Int. Cl.
*B23Q 15/00* (2006.01)

(52) U.S. Cl. ........................................................ 144/356

(58) Field of Classification Search .................... 73/597, 73/73, 801, 866; 144/356, 392, 338
See application file for complete search history.

(56) References Cited

U.S. PATENT DOCUMENTS

| | | | | |
|---|---|---|---|---|
| 4,831,545 | A * | 5/1989 | Floyd et al. | 702/40 |
| 4,916,629 | A * | 4/1990 | Bogue et al. | 702/40 |
| 7,715,011 | B2 * | 5/2010 | Huang et al. | 356/445 |
| 2005/0031158 | A1 * | 2/2005 | Biernacki et al. | 382/100 |

* cited by examiner

*Primary Examiner* — Dana Ross
*Assistant Examiner* — Jennifer Chiang
(74) *Attorney, Agent, or Firm* — Rachael Vaughn

(57) ABSTRACT

Methods are provided for determining a location of a pith along a length of a wood sample. The methods may comprise the steps of: determining pith direction; selecting two areas of the wood sample at which two or more chords of a ring can be defined; bisecting the chords to define a line perpendicular to the chords; and locating at least one intersection point for two or more of the bisecting perpendicular lines.

11 Claims, 5 Drawing Sheets

METHOD FOR GRADING A WOOD SAMPLE BASED ON PITH DIRECTION AND/OR PITH LOCATION

FIELD OF THE INVENTION

This invention relates generally to methods for determining pith location and direction relative to lumber.

BACKGROUND OF THE INVENTION

In a wood sample, the wood near the pith is the origin of branches (shown by knots). This area has low structural properties, tends to have high spiral angle, and is more prone to warp. Accordingly, knowing pith location relative to the lumber surface can be critical in warp prediction, knot size determination, and lumber grading. Currently, there are no simple ways to predict the pith location.

Its varied knot structure makes grading Southern Yellow Pine (SYP) lumber a challenge. Knots originate in the pith, so knowing the location of pith within a piece of lumber is required to estimate the size of its knots. Pith-containing and non-pith-containing lumber are well known to have contrasting wood properties. Pith containing lumber tends to be overdried in the kiln, prone to warp, and has low mechanical properties. Juvenile wood is the wood surrounding the pith. Juvenile wood has high spiral angle, low density, high microfibril angle (MFA), and poor structural properties. The ability to identify the location of pith will improve knot volume assessment, lumber warp prediction, lumber drying, and strength grading of SYP and other species. Accurate estimation of the size of knots can also optimize the recovery of clear wood in remanufacturing.

Information of the approximate location of pith relative to the surface of lumber can be derived by comparing wane, knot count, knot size and shape, and the grain swirling pattern around a knot between the sides and between the edges of a piece of lumber. Such methods are applicable only when there are knots on opposite sides of the lumber. Pith location also can be identified using end scanning techniques; however, the pith locations are interpolated from only two end points.

Accordingly, a need exists for methods for more efficient detection of pith location and direction relative to lumber along a length of the lumber.

BRIEF DESCRIPTION OF THE DRAWINGS

The embodiments of the present invention are described in detail below with reference to the following drawings.

DETAILED DESCRIPTION OF THE INVENTION

Methods are provided for determining a location of a pith along a length of a wood sample. The methods may comprise the steps of: determining pith direction; selecting two areas of the wood sample at which two or more chords of at least one ring can be defined; bisecting the chords to define a line perpendicular to the chords; and locating at least one intersection point for two or more of the bisecting perpendicular lines.

Also provided is a method for determining pith direction relative to a wood sample. The method may comprise the steps of: finding two or more pith vectors on two or more surfaces on the wood sample; determining a direction for each of the pith vectors wherein the direction is determined based on a latewood to earlywood boundary or the ratio of ring spacing on different faces; and determining pith direction based on a relationship between the directions for each of the pith vectors.

In addition, a method is provided for locating a chord of a ring of a wood sample. The method may comprise the steps of: determining at least two pith vectors on adjacent faces of the wood sample; selecting a corner common to the adjacent faces of the wood sample based on a relationship between the pith vectors; selecting end points of a ring that intersects adjacent faces in that corner; and defining a line between the end points.

In arriving at the present invention, batches of Southern Yellow Pine, Douglas-fir, Spruce-Pine-Fir (SPF), and red alder available in the Weyerhaeuser Technology Center (WTC) [Federal Way, Wash.] were examined for visual characteristics of lumber surfaces. The wood structure was examined on lumber surfaces. Features were identified possibly related to pith location. A procedure was developed to find pith location; and the efficiency of the method was evaluated.

Direction of Pith

In addition to the features described in U.S. Pat. No. 4,916,629 to Bogue, it was found that there are characteristics at clear wood areas that can be used to identify the direction of pith, namely, the pith vector, and the point of tangent of annual rings on a given face of a piece of lumber.

a. Abrupt Latewood to Earlywood Boundary

Figure 1:
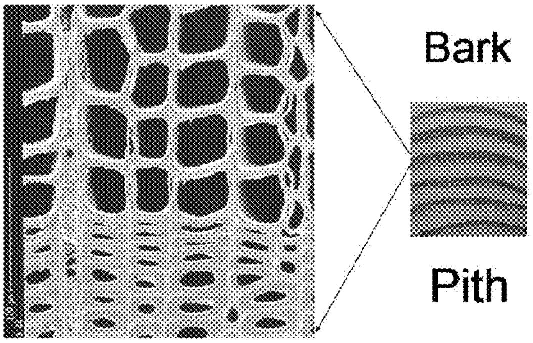
FIG. 1 is an illustration of a sharp latewood to earlywood boundary of a loblolly pine sample.
Figure 2:
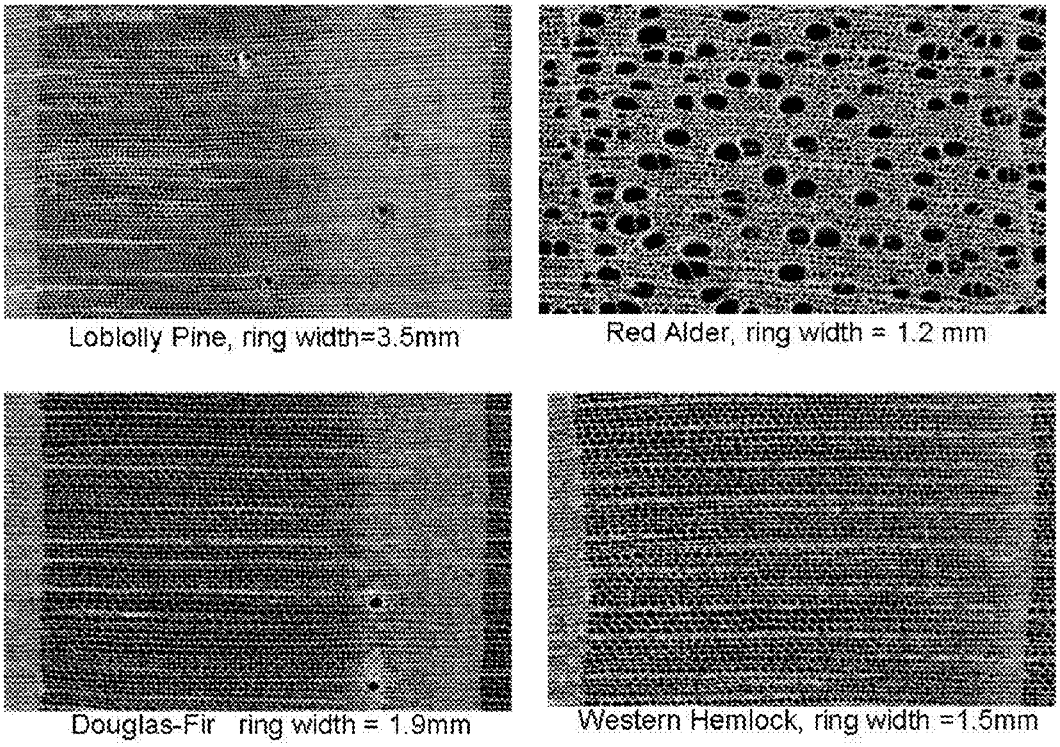
FIG. 2 is a collection of scanning electron microscope (SEM) photos illustrating the gradual and abrupt changes in latewood boundaries, such as pith on the left side.

An annual growth ring in conifers is composed of earlywood (EW), or wood that is formed in an early part of a growing season, and latewood (LW), or wood that is formed in a later part of a growing season, and is bounded by an abrupt edge and a gradual edge. The sharp LW/EW ring boundary on the bark side, as seen in FIG. 1, can be used to indicate the pith direction. During the growing season, the transition from earlywood to latewood is gradual; however, change from latewood to next year's earlywood is abrupt. Therefore, the gradual transition from EW to LW is on the pith side and the sharp boundary from LW to EW is on the bark side. Lumber cut from hardwood, with annual rings (e.g., ring-porous hardwood), shows the same pattern. Namely, that there is an abrupt change in the size of vessel elements on the bark side of the LW/EW boundary. This latewood to earlywood pattern is readily seen in species such as red alder, Douglas fir and hemlock growing in areas with distinct seasons. Scanning electron microscope (SEM) photos, such as those seen in FIG. 2, of the cross-section of a single ring of, for example, loblolly pine, red alder, Douglas-fir, and western hemlock demonstrate such gradual and abrupt changes in LW/EW boundaries. Note the changes of the size of vessel elements of red alder.

Figure 3:
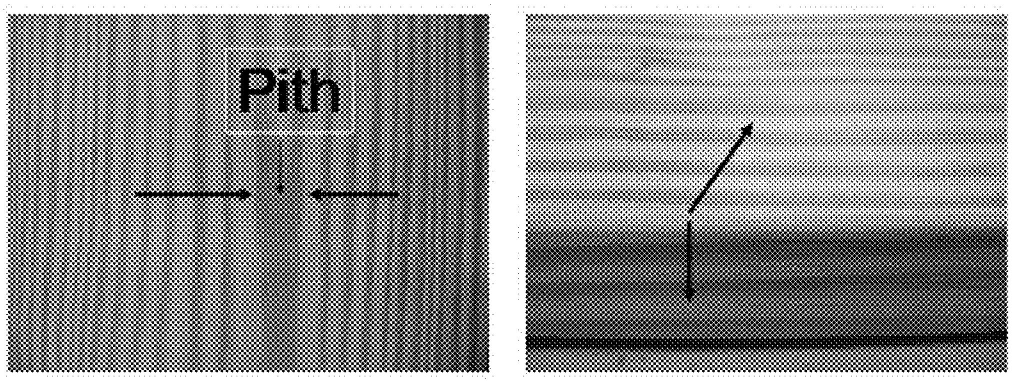
FIG. 3 provides images of gradual earlywood (white bands)-latewood edges with respect to the pith, pith vectors, and the point of tangent.

Using this feature, we can estimate the pith location relative to the surfaces of a piece of lumber, shown in FIG. 3.

b. Ring Width Patterns on Opposite Sides

Figure 4:
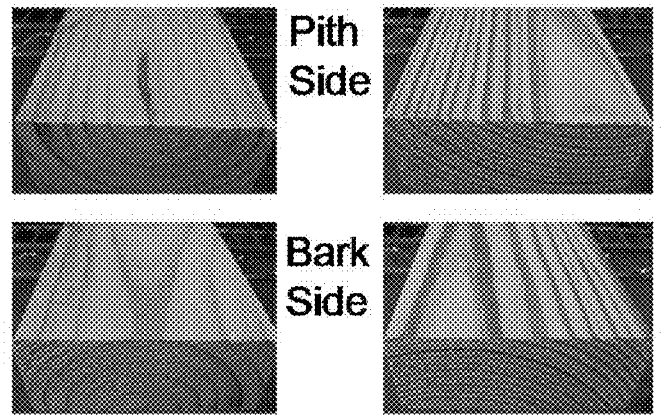
FIG. 4 provides images of pith and bark sides of two 2 inch by 4 inch boards showing the narrow earlywood and latewood bands on the pith side.
Figure 5:
FIG. 5 provides an image of wide faces of two adjacent 2 inch by 12 inch boards cut from a log (Note the ring width appears to be wider on the pith side due to the transition from wide ring to narrow ring.)

The narrowest annual ring width on a surface of a piece of lumber is cut along the rays that are perpendicular to the annual rings. If the variation in ring width is small or the same rings can be found on opposite faces of a piece of lumber, we can use the width of the annual rings on opposite faces to determine the direction of pith. The narrow rings are on the face close to the pith, as seen in FIG. 4. The method of comparing ring width on opposite faces of a piece of lumber is complicated by ring width variation. If the outer growth rings are narrower than those close to the pith, the width of the rings on the pith side is not necessarily narrower than that on the bark side. For example, if the lumber is cut precisely at the transition from wide ring to narrow ring, the ring width on the pith side may be wider than on the bark side, as shown in FIG. 5. This may lead to the conclusion that the abrupt LW/EW boundary should be used to verify the method in which the ring width is compared on opposite faces. Once we know the direction of pith, it becomes possible to find the location of pith.

Figure 6:
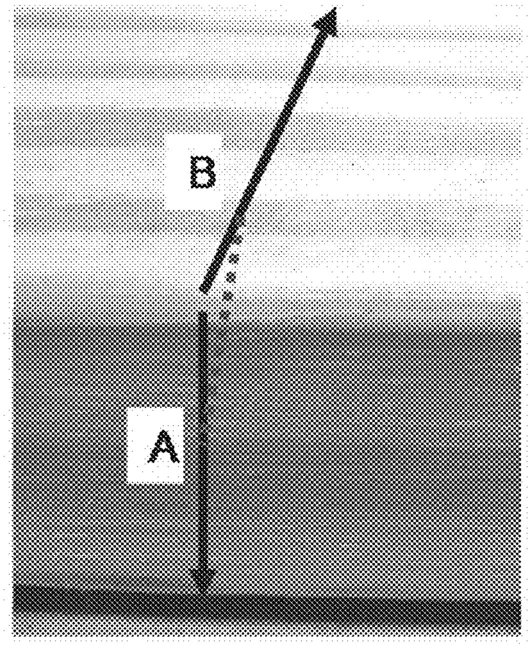
FIG. 6 is an image of a corner of a piece of lumber showing the pith vectors and two points A and B of the same ring at the corner (note that the bisecting line of AB goes through the pith)
Figure 7:
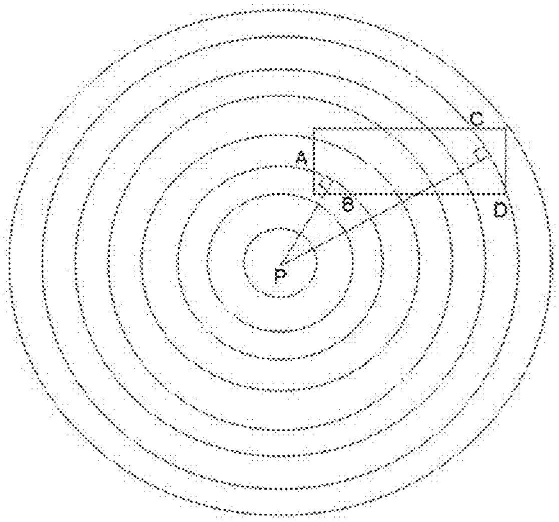
FIG. 7 illustrates an embodiment in which the intersection of the lines bisecting the chords is pith.

Location of Pith a. Finding the Chord of the Ring and the Intersection of at Least Two Bisecting Lines Any line from the origin bisecting a chord of a circle is perpendicular to the chord. The intersection of two or more such lines will identify the pith location. If we assume the annual rings are concentric, then at least three points (identifying at least two chords) on the same ring are needed to determine the location of pith. We can use the abrupt LW/EW boundary, ring width of opposite faces, or both methods to determine the pith vectors on the wide and narrow faces at a corner of a piece of lumber. If these two vectors are both toward or both away from the corner, as shown in FIG. 6, we can trace the same rings starting from the tip at the corners, identify the chords, and then determine the bisecting lines. The intersection of at least two bisecting lines is the location of pith, shown by point P in FIG. 7. The annual rings of most togs are not concentric; therefore, any additional bisecting lines will increase the accuracy of the prediction.

Figure 8:
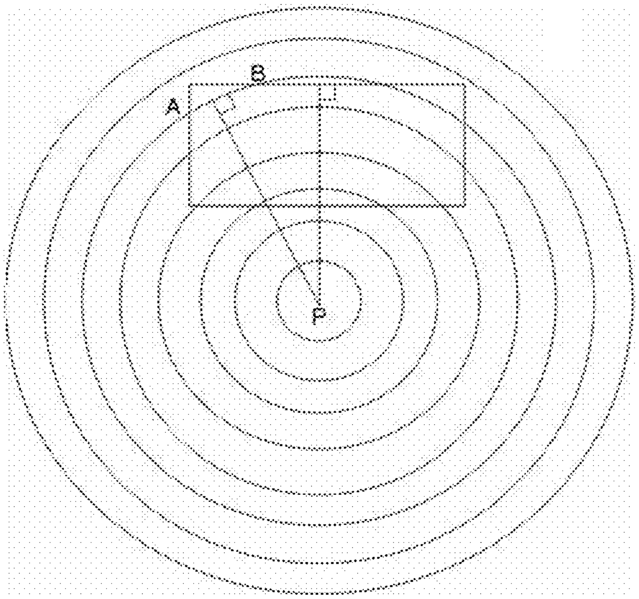
FIG. 8 illustrates an embodiment in which only one bisecting line at one corner is needed if the point of tangent of the rings exists on opposite faces of a piece of lumber.

It is possible to find one bisecting line by examining the lumber faces. If, in an embodiment, there are points of tangent on opposite faces, these two points of tangent define one line through the pith, so one may only need to find at least other line bisecting a chord at one corner, as shown in FIG. 8.

Figure 9:
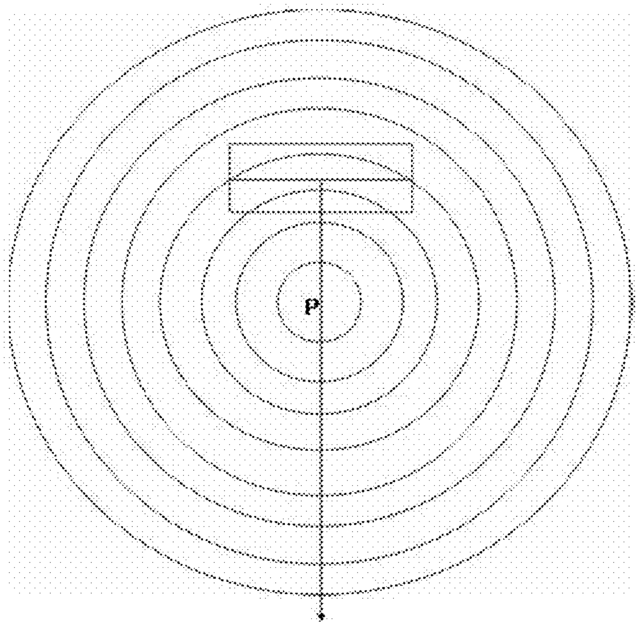
FIG. 9 illustrates an embodiment of overlapping bisecting lines at the points of tangent at the center of opposite faces of a piece of narrow lumber cut from a log with wide rings.

In one case, if 2 inch by 4 inch boards, or "2×4's" or narrows are cut from fast growing trees, which have very wide annual rings, only a few rings will be visible on the faces. If the points of tangent of the annual ring are at the center of the faces of a piece of lumber, the lines that bisect the chords overlap and no intersection may be found, as shown in FIG. 9.

In another case, if a piece of lumber is cut from outer wood areas of a large diameter log, the curvature is very small. In this case, it may be difficult to identify a chord because the ring may not be reliably traced at the surface.

Consider the X, Y, Z pith position of a piece of lumber (which may or may not be located within the piece). The coordinates of pith can be found at multiple X-Y cross-sections and these points can be connected along the length of the lumber to locate the pith of the log.

b. Ring Width and Ring Width Ratio on Surfaces

Figure 10:
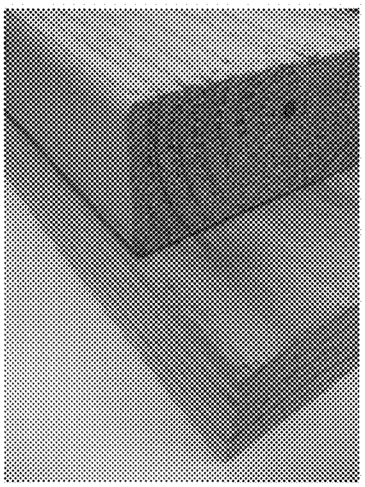
FIG. 10 is an image of corners of boards showing contrasting ring width on narrow and wide faces of lumber cut near the pith (top) and bark (bottom)
Figure 11:
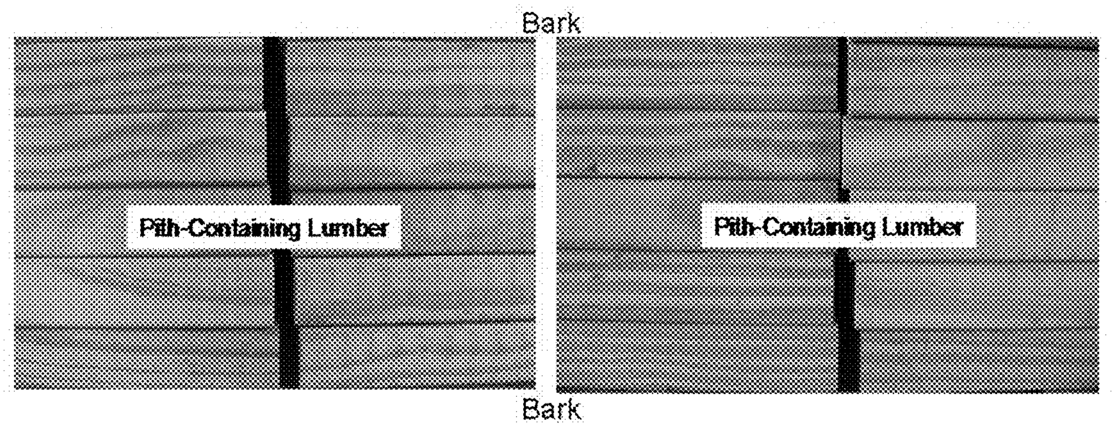
FIG. 11 provides images of the narrow faces of 2 inch by 12 inch lumber cut from four center cants (note the earlywood/latewood bands on the narrow face are wider near the pith than that near the bark).

Rings per inch or the averaged width of ring spacing can be calculated as ring width on different faces or different areas on the faces of a wood sample. Consider two pieces of lumber cut from a center cant of the log. The lumber close to the pith has wide rings on the narrow face and narrow rings on the wide face. The lumber close to the bark has wide rings on the wide face and narrow rings on the narrow face, which is the reverse pattern, as shown in FIG. 10. A ring width ratio can be determined by looking at the pattern at the corners, for example, the ring width ratio between the narrow and wide faces of wide dimension lumber. These patterns can be used to estimate the pith location relative to the lumber. The changes of ring width on the narrow face can be observed on the side of a center cant, as shown in FIG. 11.

A Combination of ring width or ring width ratio or both can be used to predict the location of pith relative to the surfaces of a wood sample. The accuracy of locating pith from ring width ratio may be improved by utilizing statistical modeling.

Location and Size of Knots

The same methods also can be used to estimate the pith vectors around a knot. Based on the patterns of the grain around the knot, the shape of the knot, and the location of pith, the volume of the knot can be calculated to improve lumber grading.

Surface roughness, off-centered pith, and the non-circularity of annual rings may introduce errors to the pith finding method. Accordingly, using one method alone may not achieve the desired accuracy in every situation; however, using complementary methods may improve the overall accuracy. Such approaches can be applied to green lumber, dry lumber, and other types of wood products for improving automatic grading and sorting.

While the embodiments of the invention have been illustrated and described, as noted above, many changes can be made without departing from the spirit and scope of the invention. Accordingly, the scope of the invention is not limited by the disclosure of the embodiments. Instead, the invention should be determined entirely by reference to the claims that follow.

What is claimed is:

1. A method for grading a wood sample comprising the steps of:

examining visual characteristics of the wood sample using visual scanning equipment;

determining pith direction from the visual characteristics;

determining pith location by:

selecting two areas of the wood sample at which two or more chords of a ring can be defined;

bisecting the chords to define a line perpendicular to the chords;

locating at least one intersection point P for two or more of the bisecting perpendicular lines;

wherein P is the pith location; and grading the wood sample based on the pith location.

2. The method of claim 1 wherein the step of determining pith direction comprises the steps of:

finding two or more pith vectors on two or more surfaces on the wood sample; and determining a direction for each of the two or more pith vectors wherein the direction is determined based on a latewood to earlywood boundary.

3. The method of claim 1 wherein the step of determining pith direction is determined is performed by examining faces of the wood sample.

4. The method of claim 1 wherein the step of determining pith direction is determined based on at least one ratio of ring spacing on opposite or adjacent faces of the wood sample.

5. A method for grading a wood sample comprising the steps of:

examining visual characteristics of the wood sample using visual scanning equipment;

using visual scanning equipment to find two or more pith vectors from the two or more surfaces on the wood sample;

determining a direction for each of the pith vectors wherein the direction is determined based on a latewood to earlywood boundary;

determining pith direction based on whether the two or more pith vectors are oriented towards or away from one another; and grading the wood sample based on the pith direction.

6. The method of claim 5 wherein the step of determining pith direction based on whether the two or more pith vectors are oriented towards or away from one another comprises:

identifying a ring intersecting adjacent faces of the wood sample where the pith vectors are directed toward each other.

7. The method of claim 5 wherein the step of determining pith direction based on whether the two or more pith vectors are oriented towards or away from one another comprises:

identifying a ring intersecting adjacent faces of the wood sample where the pith vectors are directed away from each other.

8. A method for grading a wood sample comprising the steps of:

examining visual characteristics of the wood sample using visual scanning equipment;

determining at least two pith vectors using the visual scanning equipment on adjacent faces of the wood sample;

selecting a corner common to the adjacent faces of the wood sample based on whether the at least two pith vectors are oriented towards or away from one another;

selecting end points of a ring that intersects the adjacent faces in the corner;

defining one or more chords between the end points;

bisecting the one or more chords to define a line perpendicular to the one or more chords;

locating at least one intersection point P for two or more of the bisecting perpendicular lines, wherein P indicates the pith location; and grading the wood sample based on the pith location.

9. The method of claim 1 wherein the step of examining visual characteristics of the wood sample using visual scanning equipment is performed by a scanning electron microscope.

10. The method of claim 5 wherein the step of examining visual characteristics of the wood sample using visual scanning equipment is performed by a scanning electron microscope.

11. The method of claim 8 wherein the step of examining visual characteristics of the wood sample using visual scanning equipment is performed by a scanning electron microscope.

* * * * *